UNITED STATES PATENT OFFICE.

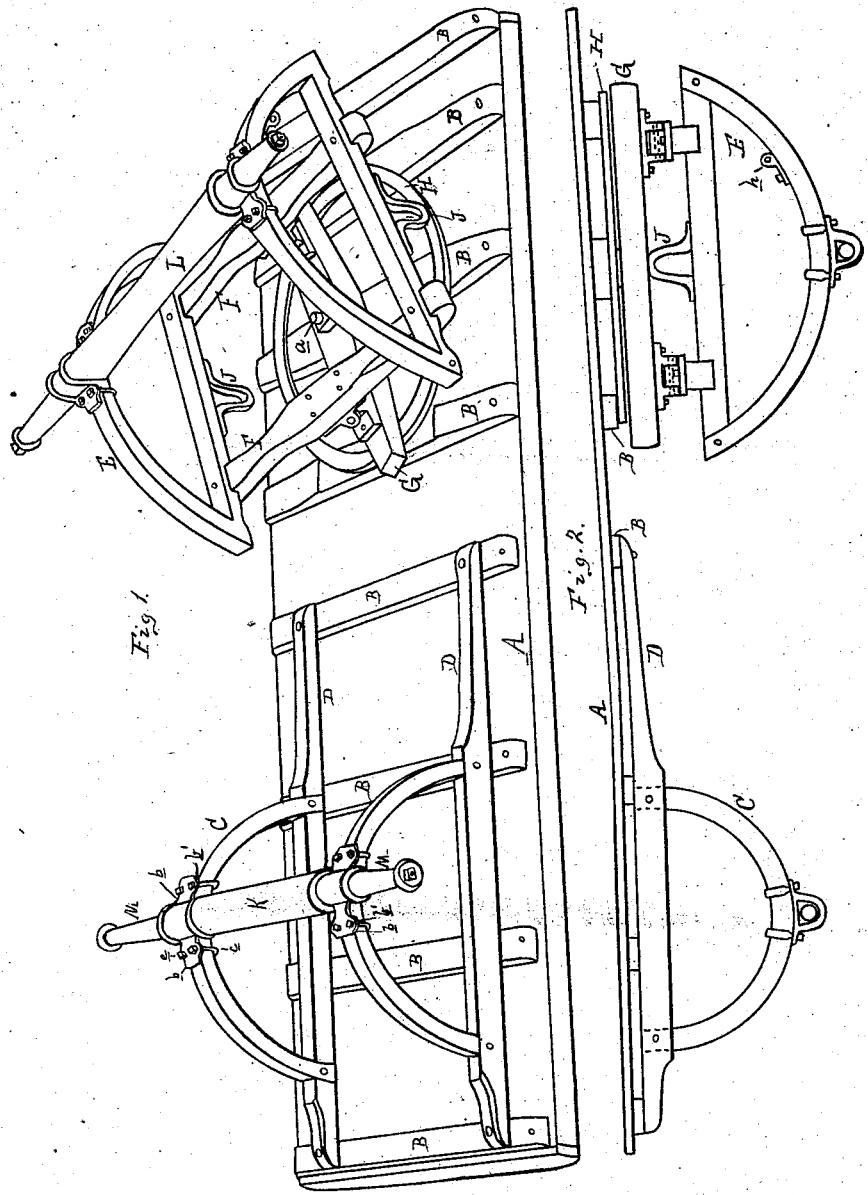

A. HENRY TODT, OF LAPEER, MICHIGAN.

WAGON RUNNING-GEAR.

SPECIFICATION forming part of Letters Patent No. 292,600, dated January 29, 1884.

Application filed August 1, 1883. (No model.)

*To all whom it may concern:*

Be it known that I, A. H. TODT, of Lapeer, in the county of Lapeer and State of Michigan, have invented new and useful Improvements in Trucks; and I hereby declare that the following is a full, clear, and exact description thereof, reference being had to the accompanying drawings, which form a part of this specification.
This invention relates to certain new and useful improvements in the construction of four-wheeled trucks; and the invention consists in the peculiar construction of the running-gear and means employed for securing the same to the bed, and in the peculiar construction, arrangement, and combination of the various parts, all as more fully hereinafter set forth.

Figure 1 is a perspective of my improved truck in a reversed position. Fig. 2 is a side elevation.

In the accompanying drawings, which form a part of this specification, A represents the bed of my improved truck, which is strengthened by the transverse plates or bars B, which are rigidly secured to the under side thereof, as in the usual manner. The rear running-gear is shown as formed of two bent pieces, C, the upper ends of which are rigidly secured to the longitudinal bars D, which in turn are rigidly or adjustably secured to the transverse bars B, the bars D being greater in length than the span of the bent pieces C, as shown, whereby greater strength and rigidity are given to the bed when the parts are secured together. The front running-gear or platform is constructed of two D-shaped side frames, E, which are connected together by the two girts F. This front gear is pivotally secured in any convenient manner at the longitudinal centers of the bars F to the bolster G, and this bolster G is pivotally secured by means of a bolt, a, to the bed.

H represents a circle-iron, which is rigidly secured in any convenient manner to the under side of the bed, and the outer ends of the bolster G should be provided upon their upper faces with rub irons or plates to prevent a wear upon the bolster coming in contact with the circle H, as in turning the wagon. Upon the upper side of the horizontal bars of the side frames, E, I secure the metallic standards J.

K and L represent the rear and front axles, and as they are secured to their respective superstructures in exactly the same manner, I will describe such connection in relation to the rear axle only. Upon the arms of the axle I secure the thimble-skeins M, and these thimble-skeins have cast upon them, between the sand-band and shoulder thereof, the outwardly-projecting flanges b, one upon either side, the upper faces of these flanges and the top of the skein at that point conforming to the curvature of the side bars, C, thus forming a bearing-surface for said side bars, to which the axle and screen are then rigidly secured by the clips c and nuts e, which clips pass through ears b', cast on the side flange, b. By this construction and the use of the curved bars C, the axle can be adjusted in any position on said curved bars and secured there, so that the rear end of the wagon may be lowered as desired. If desired, the flanges b, instead of being cast with and forming an integral part of the thimble-skein, may be cast separately as a bearing-plate, in which case they would have to be clipped to the axle. It will be observed that in the front running-gear, while I provide for a turning of the front gear upon the king-bolt, (as is provided for in all four-wheeled vehicles,) I likewise provide a side-tilting motion to such front running-gear, so that as one of the wheels passes over an obstruction or into a deep rut the platform or bed will be kept horizontal and level, while I prevent the binding of the wheels in clamping, by interposing the standards J between the tops of the side frames and the circle, as in no case can the bed so twist or tilt in turning as to bring the wheel in contact with the under side of the bed, as it is stopped and arrested by the contact between these standards J and the circle. The draft I apply by attaching the poles or shafts to suitable draw-irons or clips, h, which are secured to the side frames, E, of the front gear, as shown, and the bolster G being longitudinal with the bed instead of transverse, as in the ordinary constructions. Such bolster prevents the rocking and tilting of the front gear, while it also prevents the whipping of the tongue, and compels at all times the application of the draft in a direct line.

What I claim as my invention is—

1. In combination with the curved bars C and axle K, a thimble-skein provided with outwardly-projecting flanges $b$, having ears $b'$, and cast integral therewith, forming a bearing, and clips for adjustably securing the axle to said curved bars, substantially as described.

2. In combination with the bed A, transverse bars B, longitudinal bars D, and axle K, the curved bars C, adjustably secured to said axle by clips $c$, passing over the thimble-skeins M, said skein being provided with flanges $b$, both skein and flanges being curved, substantially as and for the purpose specified.

3. The combination, with the bed A, of the circle H, attached thereto, the longitudinal bolster G, pivoted to the bed and supporting the circle H, and a rectangularly-framed platform formed of the transverse bars F, pivoted to both the front and rear ends of the bolster, and the side pieces, E, attached to the bars F and connected with the axle, all substantially as described.

4. The combination, with the bed A, of the circle H, attached thereto, the longitudinal bolster G, pivoted to the bed and supporting the circle H, and a rectangularly-framed platform formed of the transverse bars F, pivoted to both the front and rear ends of the bolster, the side pieces, E, attached to the bars F, and connected with the axle, and provided with standards J, all substantially as described.

5. In a wagon, the combination of the bed A, frame E F, bolster G, circle H, and standards J with the axle L, provided with thimble-skeins M, which have cast upon them outwardly-projecting flanges $b$, as a base and support to the side frames of the running-gear, when constructed, arranged, and operating substantially in the manner and for the purposes set forth.

A. H. TODT.

Witnesses:
J. R. JOHNSON,
WM. E. JOHNSON.